(12) United States Patent
Nakamura et al.

(10) Patent No.: US 10,318,825 B2
(45) Date of Patent: *Jun. 11, 2019

(54) VEHICLE-MOUNTED IMAGE RECOGNITION APPARATUS AND METHOD OF MANUFACTURING THE SAME

(71) Applicants: NIDEC COPAL CORPORATION, Itabashi-ku, Tokyo (JP); NIDEC ELESYS CORPORATION, Kawasaki-shi, Kanagawa (JP)

(72) Inventors: Yuta Nakamura, Itabashi-ku (JP); Yohei Nagai, Itabashi-ku (JP); Yushi Takehara, Kawasaki (JP); Naoya Takeda, Kawasaki (JP)

(73) Assignees: NIDEC COPAL CORPORATION, Tokyo (JP); NIDEC ELESYS CORPORATION, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,798

(22) Filed: Oct. 25, 2017

(65) Prior Publication Data
US 2018/0060678 A1  Mar. 1, 2018

Related U.S. Application Data

(63) Continuation of application No. 14/882,791, filed on Oct. 14, 2015, now Pat. No. 9,836,659.

(30) Foreign Application Priority Data

Dec. 17, 2014  (JP) .................................. 2014-255485
Jan. 28, 2015  (JP) .................................. 2015-014195
(Continued)

(51) Int. Cl.
*G06K 9/00* (2006.01)
*B60R 1/00* (2006.01)
(Continued)

(52) U.S. Cl.
CPC ............ *G06K 9/00798* (2013.01); *B60R 1/00* (2013.01); *B60R 11/04* (2013.01); *B60R 2300/40* (2013.01);
(Continued)

(58) Field of Classification Search
None
See application file for complete search history.

(56) References Cited

U.S. PATENT DOCUMENTS 6,771,427 B1 *  8/2004  Matsuo .................. G02B 13/16
                                                    359/649
8,542,451 B2 *  9/2013  Lu ......................... G02B 7/025
                                                    359/819
(Continued)

OTHER PUBLICATIONS

Nakamura et al., "Vehicle-Mounted Image Recognition Apparatus and Method of Manufacturing the Same," U.S. Appl. No. 14/822,791, filed Oct. 14, 2015.

*Primary Examiner* — Nancy Bitar
(74) *Attorney, Agent, or Firm* — Keating & Bennett, LLP

(57) ABSTRACT

In a vehicle-mounted image recognition apparatus, a resolution of an image projected on an imaging plane of an image sensor is different at a position away from a center between a circumferential direction and a radial direction. To make a circumferential resolution higher than a radial resolution, at least a lower half of the imaging plane is located closer to a circumferential focus than a middle of a radial focus and the circumferential focus at a position off the optical axis center of the image projected on the image sensor through the image-forming optical system. This is achieved by adjusting the position of the imaging plane when manufacturing or by selecting a lens with high circumferential resolution. This apparatus improves recognition accuracy in recognizing traffic lanes without using an (Continued)

expensive lens exhibiting high resolution both in the circumferential direction and in the radial direction.

24 Claims, 14 Drawing Sheets

(30) Foreign Application Priority Data

Jun. 30, 2015 (JP) ................................ 2015-131127
Aug. 31, 2015 (JP) ................................ 2015-170011

(51) Int. Cl.
*B60R 11/04* (2006.01)
*H04N 7/18* (2006.01)

(52) U.S. Cl.
CPC ........ *B60R 2300/804* (2013.01); *H04N 7/183* (2013.01)

(56) References Cited

U.S. PATENT DOCUMENTS

| | | | |
|---|---|---|---|
| 8,675,120 B2* | 3/2014 | Takahashi | G03B 13/32 348/345 |
| 9,338,334 B2* | 5/2016 | Lu | G02B 7/025 |
| 2005/0018279 A1* | 1/2005 | Johnson | G02B 13/06 359/363 |
| 2011/0001867 A1* | 1/2011 | Takahashi | G02B 7/10 348/345 |
| 2012/0098926 A1* | 4/2012 | Kweon | G06T 1/00 348/36 |
| 2014/0211009 A1* | 7/2014 | Fursich | G02B 13/04 348/148 |
| 2016/0180178 A1* | 6/2016 | Nakamura | G06K 9/00798 382/104 |

\* cited by examiner

VEHICLE-MOUNTED IMAGE RECOGNITION APPARATUS AND METHOD OF MANUFACTURING THE SAME

BACKGROUND OF THE INVENTION

1. Field of the Invention

The present invention relates to a vehicle-mounted image recognition (or object recognition) apparatus and a method of manufacturing the same.

2. Description of the Related Art

A technique for detecting lines indicating a roadway (lane) on a road using a vehicle-mounted camera has recently been used for a lane keeping assist system or the like to improve driving safety of vehicles.

For example, there has been proposed a recognition apparatus that can capture an image of roadway dividing lines indicating a roadway (traffic lane or travel lane) by a camera installed in a vehicle and can recognize the roadway dividing lines or the road structure based on the image processing result of the captured image (see Japanese Patent Laid-Open No. H8-315125).

In addition, there has been provided a lane recognition apparatus that can detect the positions of lane lines on left and right sides of a vehicle in an image captured by a vehicle-mounted camera (see Japanese Patent Laid-Open No. 2007-264714).

Both of the apparatuses employ a focus-adjusted vehicle-mounted camera.

However, even if the focus is adjusted, sufficient resolving power cannot be necessarily obtained. Insufficient resolving power causes an error in recognizing a line such as a white line indicating a lane boundary drawn on a road surface. In order to reduce error occurrences, an expensive lens such as an aspherical lens that has a high resolving power needs to be used.

SUMMARY OF THE INVENTION

In view of the above, preferred embodiments of the present invention provide a vehicle-mounted image recognition apparatus that improves recognition accuracy in recognizing lines indicating a traffic lane without using an expensive lens, and a method of manufacturing the same.

An image formed by an ordinary lens is different in sharpness in a circumferential direction and in a radial direction except for the center of the image. In addition, a change in focus position provides an image of a sharp edge extending in the circumferential direction or an image of a sharp edge extending in the radial direction.

A focus position of a conventional camera is selected such that resolving powers both in the circumferential direction and in the radial direction are not so bad.

However, the inventors of the present invention have discovered that the focus position at which a sharp radial edge is obtained is more suitable for the vehicle-mounted image recognition apparatus. Many vehicle-mounted image recognition apparatuses have a function to recognize lines indicating a lane on a road surface. Sharp radial edges improve recognition accuracy in recognizing the lanes.

It is more preferable to obtain images with both of sharp radial and circumferential edges. Unfortunately, such a lens is very expensive and employing such a lens in a vehicle-mounted image recognition apparatus expected to be widely mounted on vehicles is impractical.

In view of the above-described issues, preferred embodiments of the present invention provide a vehicle-mounted image recognition apparatus at low cost.

Note that in order to obtain an image of a sharp radial edge, a focus position suitable to obtain a sharp radial edge may be selected or a lens having such a characteristic may be selected at the time of manufacturing vehicle-mounted image recognition apparatuses. In both cases, the effects of preferred embodiments of the present invention are achievable as long as an image of a sharp radial edge is resultantly obtained.

A vehicle-mounted image recognition apparatus according to an exemplary preferred embodiment of the present invention includes a fixed-focus image-forming optical system having an optical axis, the system forming an image of a front scene at a rear position on the optical axis; an image sensor disposed at the rear position on the optical axis of the image-forming optical system, the optical axis extending through an imaging plane of the image sensor; and an integrated circuit obtaining data of the image captured by the image sensor and performing an image recognition process; wherein at least a lower half of the imaging plane is located closer to the circumferential focus than a middle between a radial focus and a circumferential focus, at a position distant from an optical axis center of the image by 70% of an image height of the image; a distance between the circumferential focus and the imaging plane is smaller than a distance between the circumferential focus and the radial focus; and the image recognition process performed by the integrated circuit includes recognizing a line indicating a traffic lane on a road surface; where the radial focus is defined as a point at which a maximum radial resolving power of light converging through the image-forming optical system is obtained when a projection surface moves along the optical axis; the circumferential focus is defined as a point at which a maximum circumferential resolving power of the converging light is obtained when the projection surface moves along the optical axis; the lower half is defined as a portion of the imaging plane on which a lower half of the scene in a vertical direction is projected; and the image height is defined as half the diagonal length of the imaging plane.

Preferred embodiments of the present invention provide a vehicle-mounted image recognition apparatus that improves recognition accuracy in recognizing lines indicating a traffic lane without using an expensive lens.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
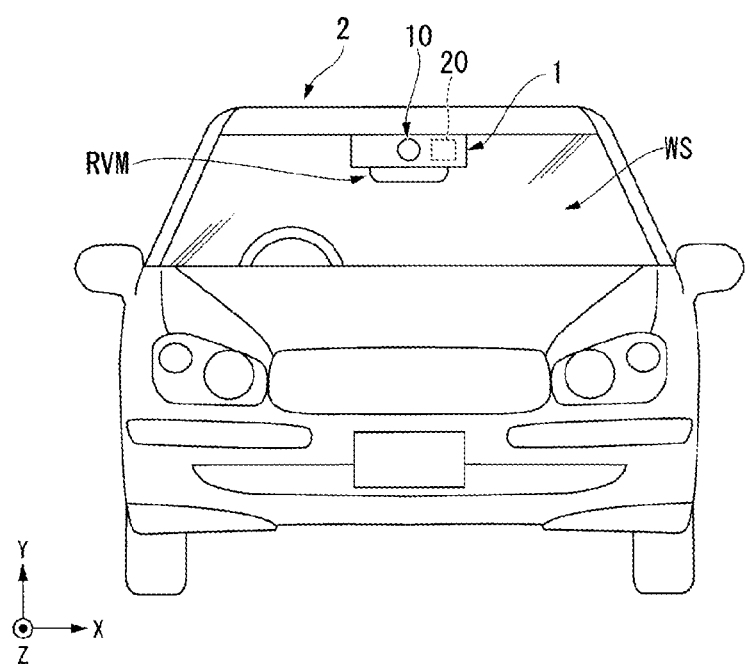
FIG. 1 is a schematic drawing illustrating an example of a vehicle including a vehicle-mounted image recognition apparatus according to a first preferred embodiment of the present invention.

Hereinafter, preferred embodiments will be described with reference to the accompanying drawings.

Note that in the drawings referred to in the following description, characteristic portions are enlarged for convenience in some cases for clarity of the portions, and hence the dimension and scale of each of components may be different from the actual dimension and scale. Note also that for the same purpose, non-characteristic portions may be omitted from the drawings.

Note also that in the following description, the X-Y-Z orthogonal coordinate system and the lx-ly-lz orthogonal coordinate system are used as needed. Here, the X-Y-Z orthogonal coordinate system is an orthogonal coordinate system relative to a traveling direction of a vehicle 2. In addition, the lx-ly-lz orthogonal coordinate system is an orthogonal coordinate system relative to an optical axis of a vehicle-mounted image recognition apparatus 1.

The vehicle-mounted image recognition apparatus 1 according to a first preferred embodiment of the present invention will now be described. FIG. 1 is a schematic drawing illustrating an example of the vehicle 2 including the vehicle-mounted image recognition apparatus 1 according to the first preferred embodiment. The front direction of the vehicle 2 is defined as a positive direction of a Z-axis, and the orthogonal directions on a plane perpendicular to the Z-axis direction are defined as an X-axis direction and a Y-axis direction. Here, the X-axis direction is defined as a horizontal leftward direction of the vehicle 2, and the Y-axis direction is defined as a vertically upward direction of the vehicle 2.

The vehicle-mounted image recognition apparatus 1 captures an image of a forward view of the vehicle 2 to obtain information about the surroundings (such as obstacles and road surfaces) of the vehicle 2 through a window shield (WS). For example, as a lane keeping assist system, the vehicle-mounted image recognition apparatus 1 captures an image of, for example, a front scene from the vehicle to recognize lines indicating a traffic lane on a road. Examples of the lines indicating a traffic lane on a road include a display object such as a white line drawn on the road.

The vehicle-mounted image recognition apparatus 1 may be disposed in a vehicle interior of the vehicle 2, or may be disposed at a front grille of the vehicle 2. Here, the description is given with reference to a non-limiting example where the vehicle-mounted image recognition apparatus 1 is disposed in the vehicle interior of the vehicle 2.

Note that the vehicle-mounted image recognition apparatus 1 may capture an image of a rearward view of the vehicle 2 to obtain information about the surroundings (such as obstacles and road surfaces) of the vehicle 2.

The vehicle-mounted image recognition apparatus 1 includes an imaging unit 10 and a control unit 20. The imaging unit 10 captures an image of a front scene from the vehicle 2. The control unit 20 is configured or programmed to perform image acquisition and image processing on the image captured by the imaging unit 10.

Figure 2:
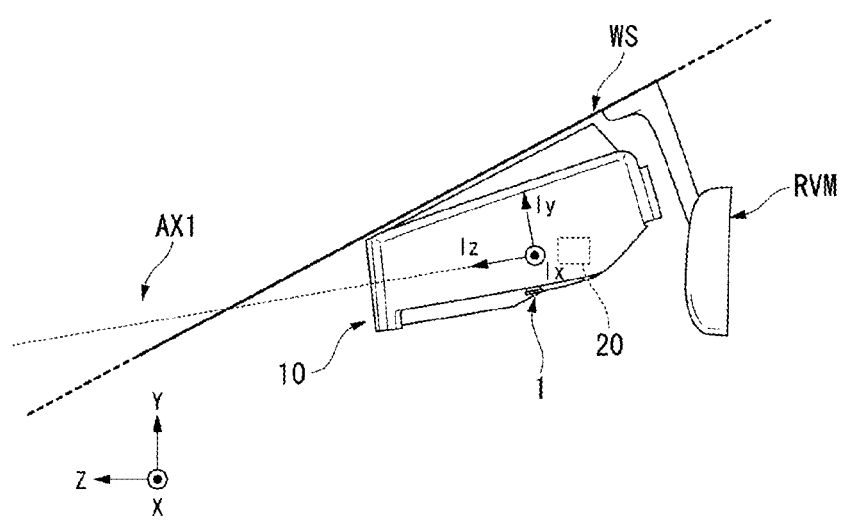
FIG. 2 is a schematic drawing illustrating an example of the vehicle-mounted image recognition apparatus according to the first preferred embodiment of the present invention attached to a vehicle interior.

FIG. 2 is a schematic drawing illustrating an example of the vehicle-mounted image recognition apparatus 1 according to the first preferred embodiment attached to the vehicle interior. In the present preferred embodiment, the vehicle-mounted image recognition apparatus 1 is attached to the vehicle with the field of view of the imaging unit 10 oriented toward the front of the vehicle. The forward view of the vehicle-mounted image recognition apparatus 1 is defined herein as a forward field of view of the imaging unit 10, when seen from the vehicle-mounted image recognition apparatus 1. Note that the vehicle-mounted image recognition apparatus 1 may be attached in such a manner that the field of view of the imaging unit 10 is oriented toward the lateral or rear side of the vehicle. In that case, the forward view of the vehicle-mounted image recognition apparatus 1 is oriented toward the lateral or rear side of the vehicle. The front direction of the vehicle-mounted image recognition apparatus 1 is defined as a positive direction of an lz-axis, and the orthogonal directions on a plane perpendicular to the lz-axis are defined as an lx-axis direction and an ly-axis direction. Here, the lx-axis direction is defined as a horizontal leftward direction of the vehicle 2, and corresponds to the X-axis direction. Note also that the configuration of the vehicle-mounted image recognition apparatus 1 illustrated herein is merely an example, and a rearview mirror RVM may be partially integrated with a housing of the vehicle-mounted image recognition apparatus, for example.

Figure 3:
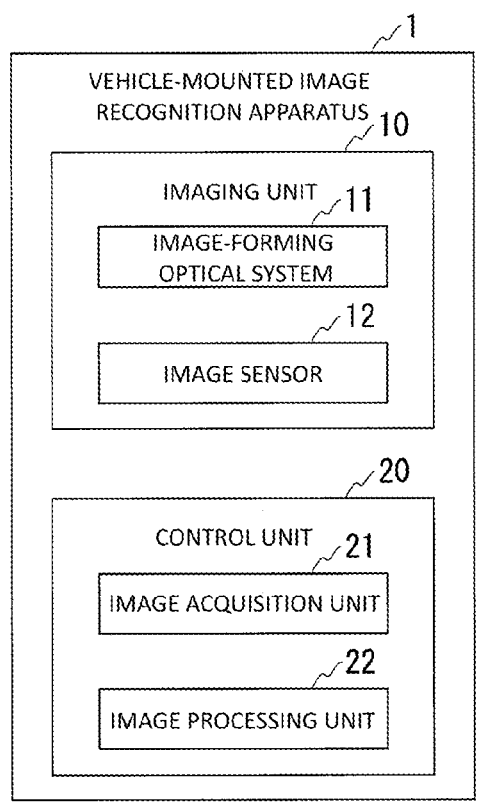
FIG. 3 is a view illustrating an example of a functional configuration of the vehicle-mounted image recognition apparatus according to the first preferred embodiment of the present invention.

FIG. 3 is a view illustrating an example of a functional configuration of the vehicle-mounted image recognition apparatus 1 according to the first preferred embodiment. The imaging unit 10 of the vehicle-mounted image recognition apparatus 1 includes an image-forming optical system 11 and an image sensor 12. As used herein, the "image-forming optical system" shall mean an optical assembly including several lenses arranged on a common optical axis and having a function of forming an image of a scene on one side of the optical axis.

The image-forming optical system 11 is a fixed-focus image-forming optical system that images a scene on one side of an optical axis AX1 on the other side thereof. The optical axis AX1 of the image-forming optical system 11 extends in a front-rear direction of the vehicle-mounted image recognition apparatus 1. The one side of the optical axis AX1 is located on a front side of the vehicle-mounted image recognition apparatus 1, and the other side of the optical axis AX1 is located on a rear side of the vehicle-mounted image recognition apparatus 1. The front side of the optical axis AX1 may be expressed herein as a positive side of the lz-axis. Likewise, the rear side of the optical axis AX1 may be expressed herein as a negative side of the lz-axis.

The image sensor 12 is a solid-state image sensor such as a charge coupled device (CCD) image sensor, a complementary metal oxide semiconductor (CMOS) image sensor, or the like, and captures an image of a scene formed on an imaging plane through the image-forming optical system 11.

The control unit 20 of the vehicle-mounted image recognition apparatus 1 preferably includes integrated circuits such as a central processing unit (CPU), a memory, an auxiliary storage device, and the like, which are connected to each other through a bus, for example. When the CPU executes programs, the control unit 20 functions as an image acquisition unit 21 and an image processing unit 22.

The image sensor 12 captures an image and the image acquisition unit 21 acquires the image from the image sensor 12. The image acquisition unit 21 outputs the acquired image to the image processing unit 22.

The image processing unit 22 performs an image recognition process on the image outputted from the image acquisition unit 21. The image processing unit 22 extracts lines from the input image and recognizes the lines as lines indicating a traffic lane on the road.

Figure 4:
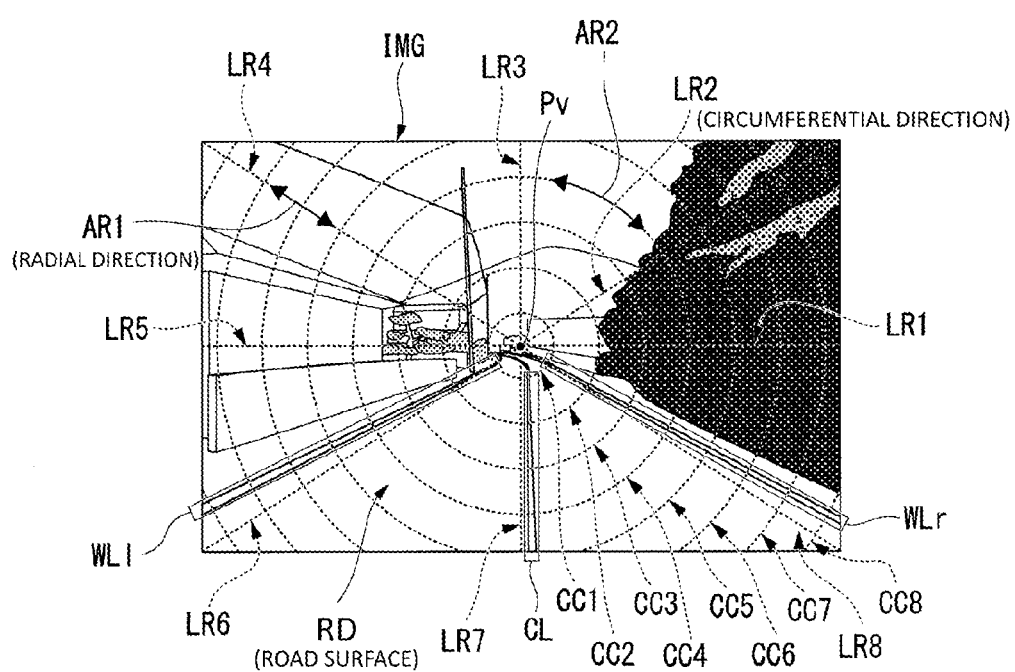
FIG. 4 is a schematic drawing illustrating an example of an image captured by an imaging unit of the vehicle-mounted image recognition apparatus according to the first preferred embodiment of the present invention.

FIG. 4 is a schematic drawing illustrating an example of an image IMG captured by the imaging unit 10 of the vehicle-mounted image recognition apparatus 1 according to the first preferred embodiment. In FIG. 4, radial lines LR1 to LR8 and concentric circles CC1 to CC8 are drawn to illustrate the radial direction and the circumferential direction, respectively, on the image, but such lines are not present in an actual image. The concentric circles CC1 to CC8 are centered on a point Pv. The point Pv is a center of the image, and is a point at which the optical axis AX1 of the image-forming optical system 11 intersects the imaging plane of the image sensor 12. As illustrated by an arrow AR1 in FIG. 4, the radial direction is referred to as a direction along the radial lines LR1 to LR8 in the description of various preferred embodiments of the present invention. As illustrated by an arrow AR2, the circumferential direction is referred to as a tangential direction of the concentric circles CC1 to CC8. Note that the concentric circles CC1 to CC8 and the radial lines LR1 to LR8 in FIG. 4 are merely examples of those lines, and hence the tangential direction and the extending direction of any concentric circles with different radii and any radial lines with different extending directions with respect to the concentric circles in FIG. 4 are also included in the circumferential direction and the radial direction, respectively.

In a specific example of the image illustrated in FIG. 4, a center white line CL, a right side line WLr, and a left side line WLl are lines (that is, lane lines) indicating a traffic lane drawn on a road surface RD of the road. These lanes extend from near the point Pv on the center of the image in the radial direction. As illustrated in FIG. 4, in the image of the front scene of the vehicle, the lines indicating the traffic lanes of the road are located outboard.

Figure 5:
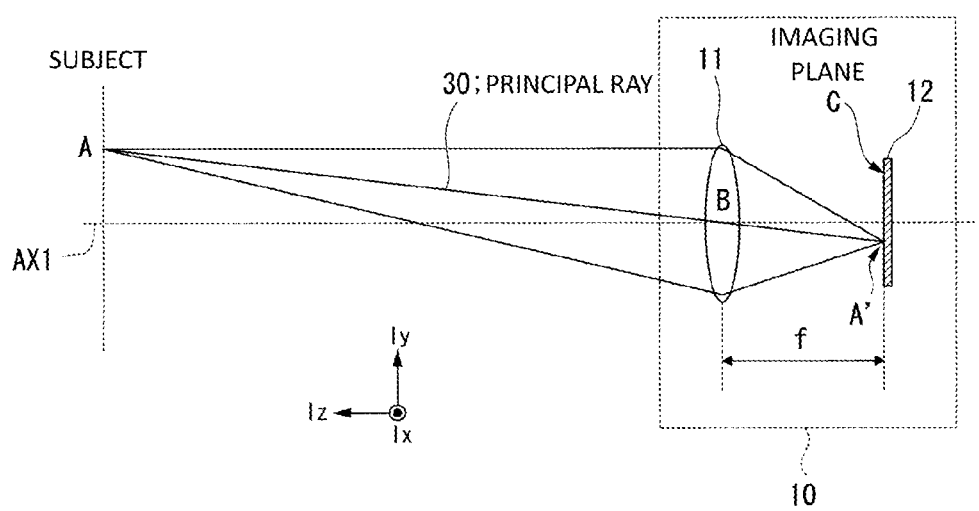
FIG. 5 is a schematic drawing illustrating a configuration of the imaging unit of the vehicle-mounted image recognition apparatus according to the first preferred embodiment of the present invention.

FIG. 5 is a schematic drawing illustrating a configuration of the imaging unit 10 of the vehicle-mounted image recognition apparatus 1 according to the first preferred embodiment.

The light emitted from a point A on a subject surface is focused at a point A' on an imaging plane C of the image sensor 12 through the image-forming optical system 11. The light emitted from other points on the subject surface is also focused at other points on the imaging plane through the image-forming optical system 11. In this manner, the light emitted from the subject forms an image on the imaging plane. The imaging plane C of the image sensor 12 is located at distance f from the image-forming optical system 11.

Figure 6:
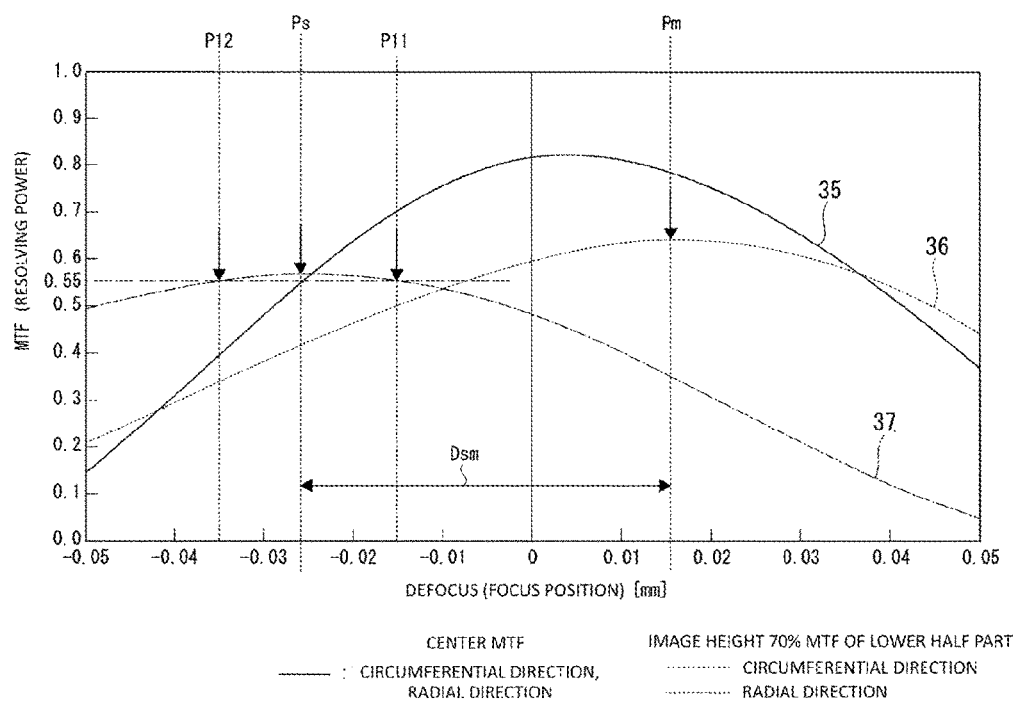
FIG. 6 is a graph illustrating an example of an MTF curve of an image-forming optical system in the vehicle-mounted image recognition apparatus according to the first preferred embodiment of the present invention.

FIG. 6 is a graph illustrating an example of MTF curves of the image-forming optical system 11 in the vehicle-mounted image recognition apparatus 1 according to the first preferred embodiment. As used herein, the term MTF stands for "Modulation Transfer Function". In the graph illustrating the MTF curves in FIG. 6, the vertical axis indicates the resolving power of the image-forming optical system 11 and the horizontal axis indicates the position of the projection surface in the optical axis direction. In this example, the position is displayed in a position relative to a reference position.

In FIG. 6, the resolving power is an indicator of image quality, and finer image details can be displayed as the value of the resolving power is larger. In general, the resolving power is expressed as a contrast ratio of white to black portions in a projected image, in which an image of black lines drawn on a white background and arranged at equal intervals in parallel is projected on the projection surface using an image-forming optical system. The contrast ratio is expressed as a maximum of 1 (100%). When the resolving power is described in this manner, it is generally necessary to specify the intervals of black lines as a prerequisite to the description. FIG. 6 illustrates the contrast ratio of the white background portion to the black lines arranged at an interval of, for example, about 42 lp/mm in the image. Note that the MTF curves in FIG. 6 are measured in an image of visible light using ImageMaster HR manufactured by Trioptics. Note that the term "lp/mm" stands for "line pairs per mm".

The curve 37 in the graph of FIG. 6 indicates the resolving power in the circumferential direction measured at a position apart from a point Pv, which is the center of the image, preferably by 70% of the image height, for example. Likewise, the curve 36 indicates the resolving power in the radial direction measured at a position apart from the point Pv preferably by 70% of the image height, for example. As is apparent from the graph, the position of the imaging plane exhibiting the highest resolving power is different between in the circumferential direction and in the radial direction. Note that the curve 35 indicates an MTF curve at the center of the image, that is, the point Pv in FIG. 4. Since there is no need to distinguish between the circumferential direction and the radial direction in the center of the image, only one curve indicates the resolving power.

The image-forming optical system generally involves aberrations, and hence the radial focus Pm does not coincide to the circumferential focus Ps at a position other than the image center. In a conventional vehicle-mounted image recognition apparatus, the imaging plane of the image sensor is located near the middle of the circumferential focus and the radial focus in the image-forming optical system to acquire moderate resolving powers for both in the circumferential direction and in the radial direction. In contrast to this, the imaging plane C of the vehicle-mounted image recognition apparatus according to the present preferred embodiment is located closer to the radial focus. Note that the image height is half the diagonal length of the imaging plane C of the image sensor 12. Note also that the circumferential focus is a point at which the maximum circumferential resolving power of an image projected by the image-forming optical system is obtained when the projection surface moves along the optical axis. Note also that the radial focus is a point at which the maximum radial resolving power of the image projected by the image-forming optical system is obtained when the projection surface moves along the optical axis.

As is apparent from FIG. 4, the line WLr and the line WL1 indicating a lane on the road surface extend in the radial direction in the image IMG. In order to ensure recognition accuracy in recognizing these lines indicating the lane, it is preferable that the edge of a line is clear on the image IMG. The higher the circumferential resolving power is, the clearer the edge of a line extending in the radial direction is. On the other hand, the radial resolving power has little effect on the clarity of the edge of the line.

Since the imaging plane C is located closer to the radial focus, the vehicle-mounted image recognition apparatus according to the present preferred embodiment enhances recognition accuracy in recognizing lines indicating a lane without a need to replace the image-forming optical system with another image-forming optical system having a higher imaging performance.

In FIG. 6, the circumferential resolving power is highest at a point where the imaging plane C is located at the circumferential focus indicated by Ps. However, the location of the imaging plane C is not required to completely matched with the point Ps. For example, a relatively good resolving power can be obtained even at a relative position of about −0.015 mm indicated by a point P11 in FIG. 6. The MTF value corresponding to the point P11 is about 0.55 and the point P11 is closer to the circumferential focus Ps than the middle between the circumferential focus Ps and the radial focus Pm, for example. In addition, a relatively good resolving power can be obtained even at a relative position of about −0.036 mm indicated by the point P12 in FIG. 6, for example. The MTF value corresponding to the point P12 is about 0.55, for example. Even if the imaging plane C is located at either the point P11 or the point P12 in FIG. 6, the circumferential resolving power is greater than the radial resolving power. If the imaging plane C is located at a relative position of about −0.036 mm indicated by the point P12, for example, which is on an opposite side to the radial focus Pm with respect to the circumferential focus Ps, the radial resolving power is less than that at the point P11. However, the effects of various preferred embodiments of the present invention are achievable even in such an arrangement unless the circumferential resolving power is impaired.

As the imaging plane C is located farther left than the circumferential focus Ps in FIG. 6, the radial resolving power is further reduced and the circumferential resolving power is also reduced. However, there is no change in the state in which the circumferential resolving power exceeds the radial resolving power. Thus, although the resolving power is reduced as whole, a relatively sharp state of the lane boundary is maintained. When vehicle-mounted image recognition apparatuses are mass-produced, it is difficult to completely keep the assembly accuracy, and hence some vehicle-mounted image recognition apparatuses may have imaging plane C located as described above. However, even if it happens, the circumferential resolving power is essentially given a higher priority in an vehicle-mounted image recognition apparatus according to a preferred embodiment of the present invention, which avoids a remarkable reduction in recognition accuracy in recognizing lines indicating a lane. Note that it is not preferable that the imaging plane C is located excessively left in FIG. 6, and hence it is necessary to avoid the state where the imaging plane C is located exceeding the distance Dsm between the circumferential focus and the radial focus and is located off to the left side of the circumferential focus. It is more preferable that the imaging plane C is located less than half of the distance Dsm, for example.

Note that the MTF curves in FIG. 6 are obtained by measuring black lines arranged preferably at an interval of 42 lp/mm on the white background in the image, but in various preferred embodiments of the present invention, the interval of the black lines for use in measuring an MTF function is not limited to 42 lp/mm. The interval of measuring lines may be wider than 42 lp/mm. However, if too much wider line spacing is selected than the pixel spacing of the image sensor, only MTF curves inappropriate for the image resolving power of the image sensor are obtained. On the contrary, selection of too narrow spacing requires excessive quality of the image-forming optical system, which is not preferable.

The image sensor preferably uses a color filter array with 3 pixels×3 pixels as a unit to generate a color image, for example. Examples of such a color filter array include a Bayer filter. While taking the moving average in an area of 3 pixels×3 pixels, red, green and blue values for each pixel are calculated by using the Bayer filter.

For this reason, if the lines spaced apart at twice the pixel spacing are image-captured by such an image sensor, the obtained image has little contrast. Therefore, when MTF curves are measured to attain the vehicle-mounted image recognition apparatuses of various preferred embodiments of the present invention, black lines arranged at a larger interval than twice the pixel spacing should be used. Meanwhile, if the black lines spaced apart at nine times the pixel spacing are image-captured by the image sensor, the obtained image has sufficient contrast. Thus, the nine times the pixel spacing can be set as the upper limit to choose a spacing of the black lines for measurement of MTF curves and then an image-forming optical system having reasonable characteristics may be selected.

The image sensor 12 according to the first preferred embodiment preferably includes a light receiving sensor with a pixel spacing d of about 4.2 μm, for example. Thus, the value of 1/(9d) is about 26.4 lp/mm, for example. In FIG. 6, the measurement is made at a spacing of 42 lp/mm narrower than the above spacing. Note that the spacing of 42 lp/mm preferably is smaller than the value of 1/(2d), that is, 119 lp/mm corresponding to twice the pixel spacing. When the imaging plane is located at the point P11 and the point P12 in FIG. 6, the MTF value of the circumferential resolving power preferably is about 0.55. If the MTF value is measured at the same points at the spacing of 26.4 lp/mm, a value larger than about 0.55 is obtained, for example.

For each of the circumferential resolution and the radial resolution, only one MTF curve at an image height 70% point is illustrated in FIG. 6. In general, MTF curves at points away from the center of the image are different depending on the circumferential positions, but a pair of MTF curves are shown as a representative in FIG. 6. In the vehicle-mounted image recognition apparatus according to the present preferred embodiment, the imaging plane C is located closer to the circumferential focus than a middle between the circumferential focus and the radial focus. The above condition may be satisfied only in a half of the image, i.e. C_low, vertically lower than the center of the image, i.e. the point Pv, on the imaging plane C. This is because the circumferential resolving power is important for recognizing lines indicating a traffic lane drawn on a road surface, and the road surface appears only on the lower half of the image. Note that the image-forming optical system 11 according to the present preferred embodiment forms an inverted image and hence the C_low representing the vertically lower half of the image corresponds to the vertically upper half of the real space as illustrated in FIG. 7.

A vehicle-mounted image recognition apparatus according may be configured according to a preferred embodiment of the present invention without using some of the effective light receiving sensors of the image sensor. For example, the image sensor has a structure that can output an image with a frame of 1280 horizontal pixels by 800 vertical pixels, but uses the image only in a range of 1200 horizontal pixels by 720 vertical pixels in the frame. In this case, the imaging plane C of a preferred embodiment of the present invention corresponds to a region of 1200 horizontal pixels by 720 vertical pixels, for example. Note that the image height in this case also corresponds to half the diagonal length of the imaging region of the image sensor used for image-capturing.

Figure 7:
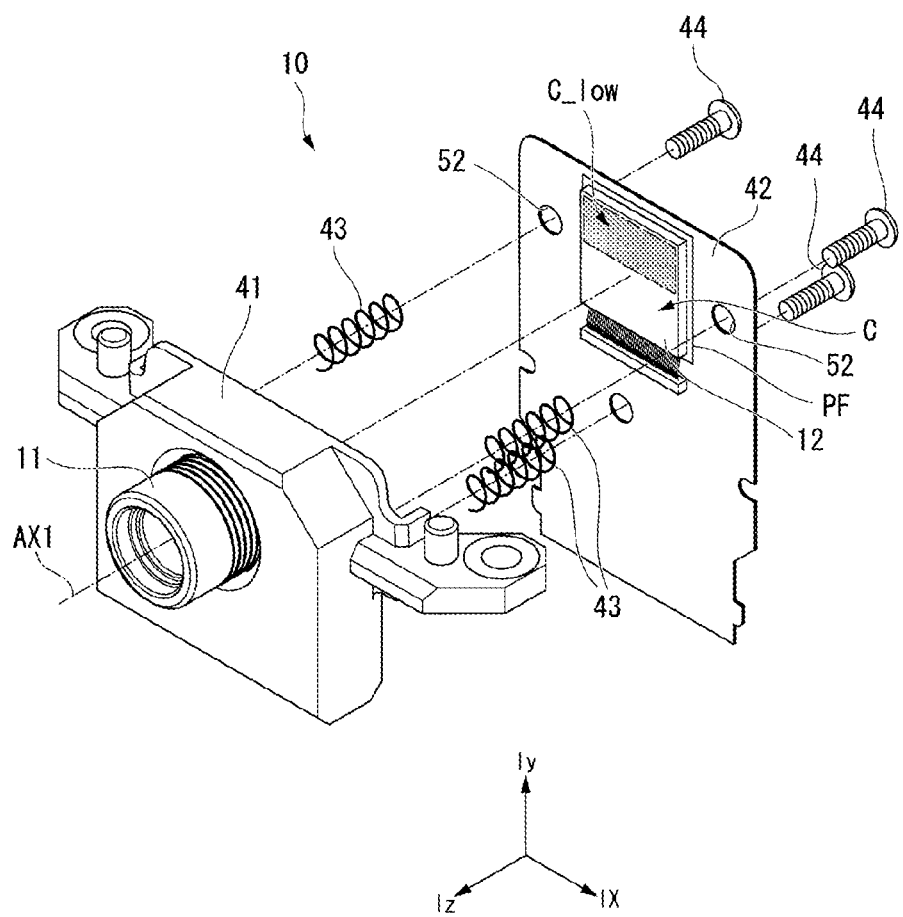
FIG. 7 is an exploded perspective view of the imaging unit of the vehicle-mounted image recognition apparatus according to the first preferred embodiment of the present invention.
Figure 8:
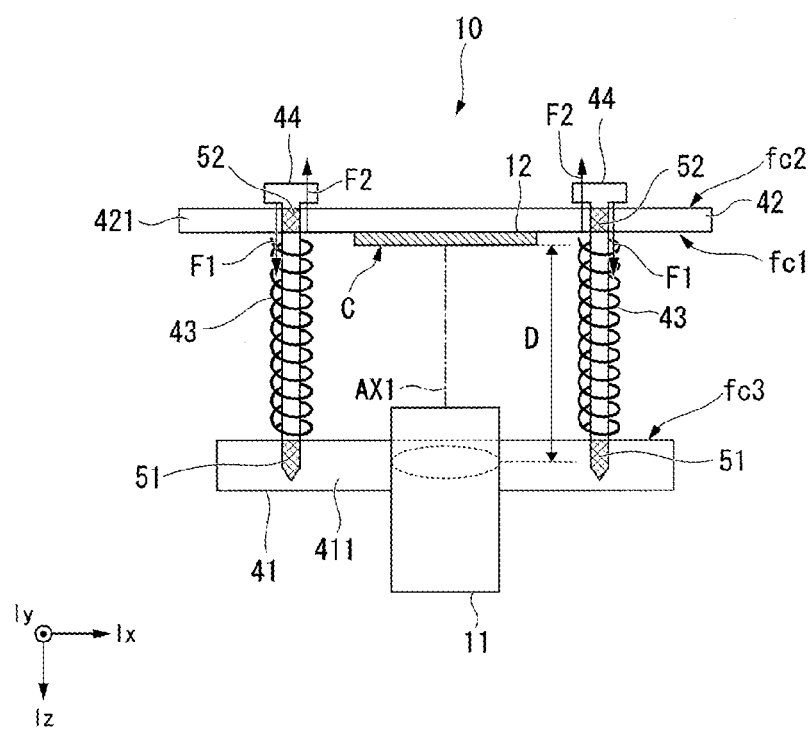
FIG. 8 is a partial sectional view of the imaging unit of the vehicle-mounted image recognition apparatus according to the first preferred embodiment of the present invention.

With reference to FIGS. 7 and 8, the structure of the imaging unit 10 of the vehicle-mounted image recognition apparatus 1 according to the first preferred embodiment will now be described. FIG. 7 is an exploded perspective view of the imaging unit 10 of the vehicle-mounted image recognition apparatus 1 according to the first preferred embodiment. FIG. 8 is a partial sectional view of the imaging unit 10 of the vehicle-mounted image recognition apparatus 1 according to the first preferred embodiment.

The imaging unit 10 includes the image-forming optical system 11, the image sensor 12, an image-forming optical system retainer 41, a sensor retainer 42, three elastic members 43, and three headed screws 44. Note that one of the three elastic members 43 and one of the three headed screws 44 are not illustrated in FIG. 8.

The image-forming optical system 11 is a fixed-focus image-forming optical system that forms an image of a front scene at a rear position on an optical axis AX1. In a specific example illustrated in FIG. 7, the image-forming optical system includes a lens barrel with the lens fixed inside. The image-forming optical system 11 includes a plurality of lenses. The image-forming optical system 11 preferably has an F-value of 2, but the value may be less than 2, for example.

The image sensor 12 is disposed at the rear position on the optical axis AX1 of the image-forming optical system 11. The optical axis AX1 of the image-forming optical system 11 passes through the imaging plane C of the image sensor 12. The image sensor 12 converts a subject image formed through the lens of the image-forming optical system 11 into an electronic signal for image-capturing.

The image-forming optical system retainer 41 is a block having a rectangular or substantially rectangular shape when it is seen along the optical axis AX1 as illustrated in FIGS. 7 and 8. The image-forming optical system retainer 41 is made of aluminum alloy, but the material is not limited to aluminum alloy. Alternatively, a ferritic or austenitic stainless steel, or copper alloy may be used as the material. The image-forming optical system 11 is fitted into an opening portion near the center of a main portion 411 of the image-forming optical system retainer 41 and is fixed to the image-forming optical system retainer 41.

Screw holes 51 are threaded into a surface of the main portion 411 of the image-forming optical system retainer 41, the surface facing the image sensor 12 (in the negative direction of the lz-axis). The screw holes 51 are one specific example of fastening portions that fasten the headed screws 44 to the image-forming optical system retainer 41.

The sensor retainer 42 holds the image sensor 12. The imaging plane C of the image sensor 12 fixed to (retained by) the sensor retainer 42 faces in the positive direction of the lz-axis.

The sensor retainer 42 includes a main portion 421 which is a plate made of aluminum alloy. The main portion 421 of the sensor retainer 42 includes through-holes 52 passing therethrough in the direction of the lz-axis. Shaft portions of the headed screws 44 are inserted into the through-holes 52. The sensor retainer 42 includes a flexible printed circuit board PF having the image sensor 12 mounted thereon. The image sensor 12 is fixed to the sensor retainer 42 with the flexible printed circuit board PF therebetween.

Note that in FIG. 7, the number of the elastic members 43, the headed screws 44, the screw holes 51, and the through-holes 52 is three, but the number is merely an example and is not limited to this. Note also that FIG. 8 illustrates two elastic members 43, two headed screws 44, two screw holes 51, and two through-holes 52 by way of example, and another elastic member 43, headed screw 44, screw hole 51, and through-hole 52 are not illustrated in the figure.

Specific configurations of the elastic member 43 and the headed screw 44 will now be described.

The headed screw 44 passes through the through-hole 52 of the sensor retainer 42 and is screwed into the screw hole 51 of the image-forming optical system retainer 41.

The elastic member 43 is an elastic member such as a spring made of a material such as aluminum or phosphor bronze, or rubber. FIG. 7 illustrates an example where the elastic member 43 is a coil spring. The elastic member 43 is arranged coaxially with the headed screw 44 between the image-forming optical system retainer 41 and the sensor retainer 42. When the headed screw 44 is screwed into the screw hole 51, the elastic member 43 is brought into contact with a surface fc3 of the image-forming optical system retainer 41 and a surface fc1 of the sensor retainer 42. The elastic member 43 applies a force to separate the image-forming optical system retainer 41 and the sensor retainer 42 from each other. The surface fc3 faces in the negative direction of the lz-axis, and the surface fc1 faces in the positive direction of the lz-axis.

Specifically, the elastic member 43 pushes the surface fc1 of the sensor retainer 42 by a force F2. The headed screw 44 pushes the surface fc2 of the sensor retainer 42 facing in the negative direction of the lz-axis by a force F1. The headed screw 44 is screwed into the screw hole 51 while the head portion of the screw 44 is pushed against the surface fc2 of the sensor retainer 42 by the elastic member 43. A distance D between the lens inside the image-forming optical system 11 and the imaging plane C of the image sensor 12 is adjusted by adjusting the amount of screwing of a distal end portion of the headed screw 44 into the screw hole 51. In other words, the elastic member 43 and the headed screw 44 fix a relative position of the image-forming optical system retainer 41 and the sensor retainer 42.

Note that the elastic member 43 may be a member which is plastically deformed when a force is applied. The reason for this is that a plastically deformed member is accompanied by elastic deformation and is able to act like an elastic member.

A non-limiting example of a method of manufacturing the vehicle-mounted image recognition apparatus 1 according to the first preferred embodiment will now be described.

Figure 9:
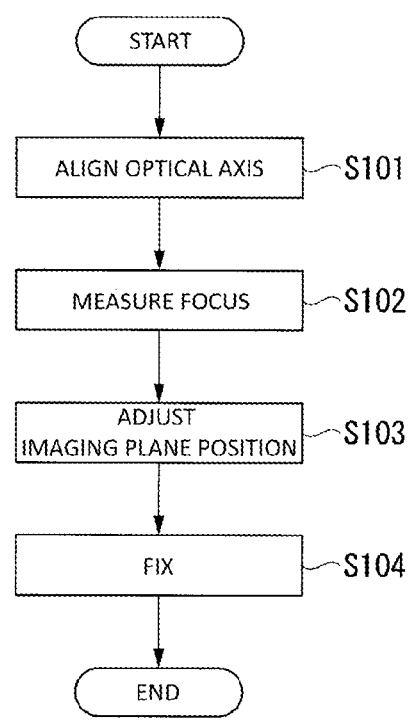
FIG. 9 is a flowchart of a method of manufacturing the vehicle-mounted image recognition apparatus according to the first preferred embodiment of the present invention.

FIG. 9 is a flowchart of a method of manufacturing the vehicle-mounted image recognition apparatus 1 according to the first preferred embodiment.

As illustrated in FIG. 9, the vehicle-mounted image recognition apparatus 1 according to the first preferred embodiment is manufactured through an optical axis alignment step (step S101), a focus measurement step (step S102), an imaging plane position adjustment step (step S103), and a fixing step (step S104). Hereinafter, each step will be specifically described.

First, the direction of the optical axis AX1 of the image-forming optical system 11 fixed to the image-forming optical system retainer 41 is measured and the optical axis AX1 is then aligned in a desired direction in the optical axis alignment step (step S101). The desired direction refers to a state where the optical axis AX1 perpendicularly intersects the imaging plane C. The direction is aligned by moving the position of the image sensor 12 relative to the image-forming optical system 11 by adjusting the amount of screwing of the distal end portion of the headed screw 44 into the screw hole 51 of the image-forming optical system retainer 41.

Note that the optical axis alignment step (step S101) may be omitted.

Then, the focus of the image-forming optical system 11 is measured in the focus measurement step (step S102). More specifically, the positions of the circumferential focus of an image where the distance from the optical axis center is located preferably at about 70% of the image height in the image projected on the projection surface and the radial focus of the image where the distance from the optical axis center is located preferably at about 70% of the image height in the image projected on the projection surface are selected as focus measurement positions, and the radial focus at the position is measured. If the optical axis AX1 passes through the point Pv which is the center of the imaging plane C, these focuses are substantially constant regardless of the circumferential position. If the optical axis AX1 passes through a position different from the point Pv which is the center of the imaging plane C, these focuses differ depending on the circumferential position. In this case, it is necessary to select at least two positions on a lower half of the imaging plane C as the focus measurement positions, measure each focus thereof, and determine the position of the imaging plane C by referring to the measurement results.

Note that in the following description, "the circumferential focus of an image where the distance from the optical axis center is located preferably at about 70% of the image height of the image" is also referred to as "image height 70% circumferential focus". Note also that "the radial focus of an image where the distance from the optical axis center is located preferably at about 70% of the image height of the image" is also referred to as "image height 70% radial focus".

Then, the imaging plane C of the image sensor 12 is moved relative to the image-forming optical system 11 and the position of the imaging plane C is adjusted in the imaging plane position adjustment step (step S103). More specifically, the position of the image sensor 12 is moved relative to the image-forming optical system 11 by adjusting the amount of screwing of the distal end portion of the headed screw 44 into the screw hole 51 of the image-forming optical system retainer 41.

Here, the position in the optical axis AX1 direction of the imaging plane C of the image sensor 12 is adjusted closer to the image height 70% circumferential focus than a middle between the image height 70% circumferential focus and the image height 70% radial focus. In FIG. 6, the position corresponds to a point closer to Ps than the middle between the image height 70% radial focus Pm and the image height 70% circumferential focus Ps. In FIG. 6, the imaging plane C of the image sensor 12 may be located on the right side of the point Ps. Note that the position should be adjusted such that the distance between the image height 70% circumferential focus Ps and the imaging plane C is smaller than the distance between the image height 70% circumferential focus Ps and the image height 70% radial focus Pm.

Note that it is more preferable that the optical axis AX1 is aligned in the optical axis alignment step in such a manner that the optical axis AX1 intersects the imaging plane C at the point Pv which is the center of the imaging plane C. In order to enable such an adjustment, the imaging unit 10 can include an additional adjustment mechanism that moves the image sensor in a direction perpendicular or substantially perpendicular to the optical axis.

Note that in the above focus measurement step, the focus measurement position is not limited to the position where the distance from the optical axis center is located at about 70% of the image height. For example, the position may be spaced away from the center of the optical axis by about half the distance between the optical axis center and an edge of the imaging plane C or greater than the distance, for example. If the position of the imaging plane C away from the center of the optical axis by about 70% of the image height resultantly falls within the scope of the present invention, then the method of manufacturing such a product should be regarded as a manufacturing method according to the present claims. Note that the focus measurement position may be farther away than about 70% or more of the image height, but it is not preferable to select a position exceeding 100% of the image height.

Next, the image sensor 12 is fixed relative to the image-forming optical system 11 in the fixing step (step S104). Specifically, a jig used to adjust the headed screw 44 is removed from the headed screw 44. The relative position of the image-forming optical system retainer 41 and the sensor retainer 42 is fixed by a repulsive force due to elastic deformation of the elastic member 43 or a repulsive force caused by residual stress due to the plastic deformation.

Figure 10:
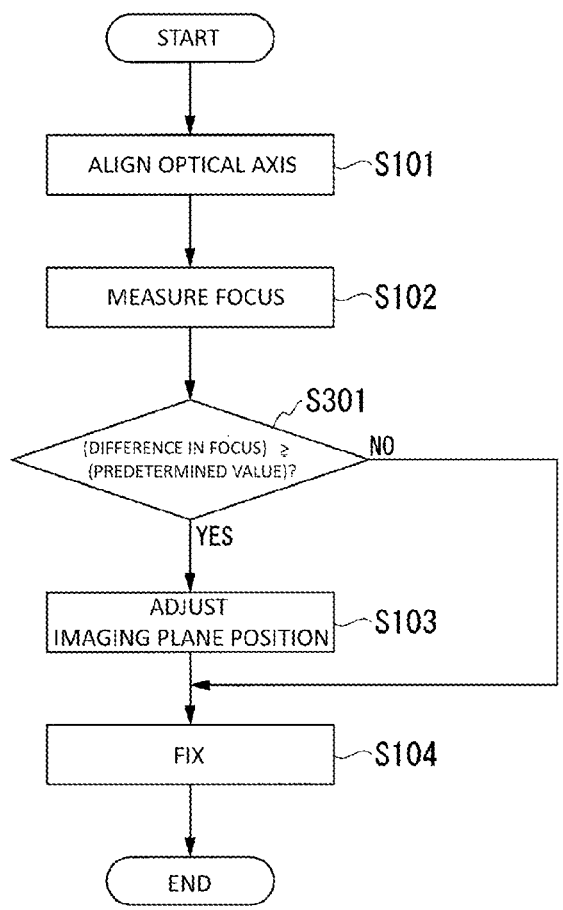
FIG. 10 is a flowchart of a method of manufacturing the vehicle-mounted image recognition apparatus according to a modification of the first preferred embodiment of the present invention.

A modification of the manufacturing method according to the first preferred embodiment will now be described. FIG. 10 is a flowchart of the manufacturing method according to the modification of the first preferred embodiment.

As illustrated in FIG. 10, the manufacturing method according to the modification of the first preferred embodiment is different from the method of manufacturing the vehicle-mounted image recognition apparatus 1 according to the first preferred embodiment illustrated in FIG. 9 in that the focus measurement step (step S102) is followed by a determination step performed based on the measured focus (step S301). The description is omitted about procedures common to the manufacturing method according to the modification of the first preferred embodiment and the method of manufacturing the vehicle-mounted image recognition apparatus 1 according to the first preferred embodiment.

After the focus measurement step (step S102), the difference between the image height 70% circumferential focus and the image height 70% radial focus measured in step S102 is compared with a predetermined value (step S301). In the following description, "the difference between the image height 70% circumferential focus and the image height 70% radial focus measured in step S102" is also referred to as "the difference between the circumferential focus and the radial focus" or simply as "the difference in focus".

In this example, it is determined in step S301 whether or not the difference in focus is greater than or equal to a predetermined value. If the difference in focus is greater than or equal to the predetermined value (step S301: YES), the process moves to step S103. If the difference in focus is not greater than or equal to the predetermined value (step S301: NO), the process moves to step S104.

As described above, in the manufacturing method according to the modification of the first preferred embodiment, the imaging plane position adjustment step is carried out if the difference between the circumferential focus and the radial focus in the image-forming optical system 11 is greater than or equal to the predetermined value. Meanwhile, in the manufacturing method according to the modification, the imaging plane position adjustment step is not carried out if the difference between the circumferential focus and the radial focus in the image-forming optical system 11 is less than the predetermined value.

In this manner, in the manufacturing method according to the modification of the first preferred embodiment, the imaging plane position adjustment step is carried out on products in which the difference between the circumferential focus and the radial focus in the image-forming optical system is greater than or equal to the predetermined value among products to be manufactured. Thus, the imaging plane position adjustment step in the manufacturing method of the modification of the first preferred embodiment may be omitted for products in which the difference in focus is less than the predetermined value.

Alternatively, in the manufacturing method according to the modification of the first preferred embodiment, a predetermined proportion of products to be manufactured may be subjected to the imaging plane position adjustment step in descending order of the difference in focus.

Figure 11:
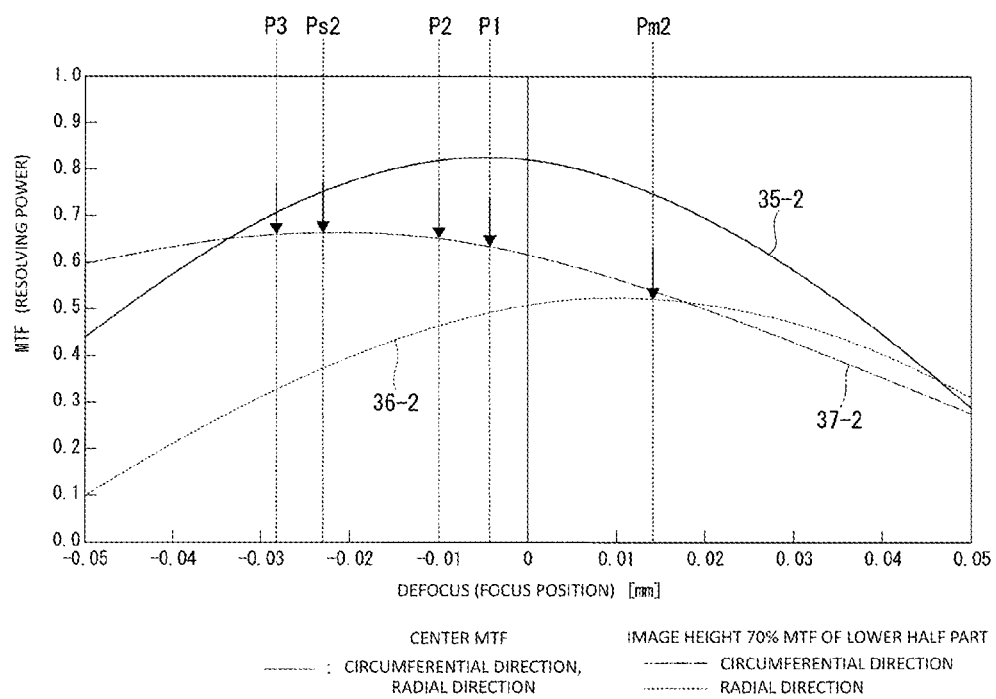
FIG. 11 is a graph illustrating an example of MTF curves of an image-forming optical system in a vehicle-mounted image recognition apparatus according to a second preferred embodiment of the present invention.

FIG. 11 is a graph illustrating an example of MTF curves of an image-forming optical system 11-2 according to a second preferred embodiment of the present invention. The measurement conditions are the same as those in FIG. 6. The difference between the graph in FIG. 11 and the graph in FIG. 6 is that the circumferential resolving power is also higher than the radial resolving power at radial focus Pm2. In general, the image-forming optical system exhibiting such MTF curves is not treated as a high quality image-forming optical system in that the MTF curve in the circumferential direction is greatly different from that in the radial direction, and the focus position is also different therebetween. However, such an image-forming optical system is effective when applied to the vehicle-mounted image recognition apparatus according to various preferred embodiments of the present invention because the image-forming optical system clearly shows the contour of lines representing a traffic lane.

In the image-forming optical system 11-2 according to the present preferred embodiment, even if the imaging plane C is located on the radial focus, the circumferential resolving power is higher than the radial resolving power. Although the vehicle-mounted image recognition apparatus is able to be used in such a state, it is more preferable that the imaging plane C is located near the circumferential focus like the first preferred embodiment because the circumferential resolving power is more enhanced. A more preferable position of the imaging plane C is a position closer to the circumferential focus Ps2 than the point P1 located at the middle between the circumferential focus Ps2 and the radial focus Pm2 like the first preferred embodiment. For example, a point P2 is preferable. Another preferable position may be a point P3 opposite to the radial focus Pm2 with respect to the circumferential focus Ps2.

Note that in the following description, when no distinction is made between the image-forming optical system 11 and the image-forming optical system 11-2, the image-forming optical system 11 and the image-forming optical system 11-2 are collectively referred to simply as the image-forming optical system 11.

A third preferred embodiment of the present invention will now be described with reference to FIG. 12.

Figure 12:
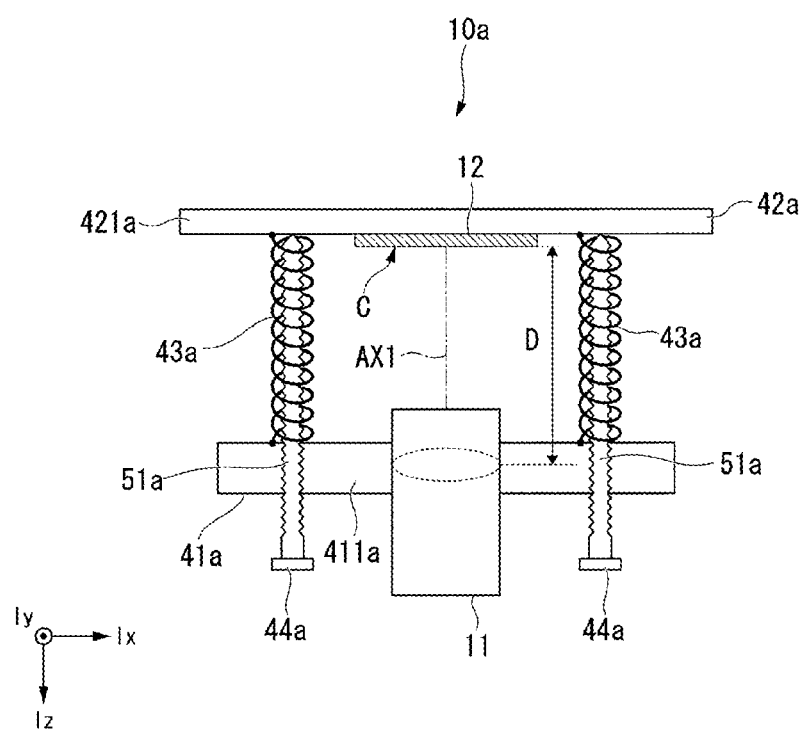
FIG. 12 is a partial sectional view of an imaging unit of a vehicle-mounted image recognition apparatus according to a third preferred embodiment of the present invention.

FIG. 12 is a partial sectional view of an imaging unit 10a of a vehicle-mounted image recognition apparatus according to the third preferred embodiment.

A third preferred embodiment of the present invention will now be described with reference to FIG. 12.

The vehicle-mounted image recognition apparatus according to the third preferred embodiment is different from the vehicle-mounted image recognition apparatus 1 according to the first preferred embodiment in that end portions of an elastic member 43a are respectively fixed to an image-forming optical system retainer 41a and a sensor retainer 42a and disposed in a stretched manner. Of the components of the imaging unit 10a illustrated in FIG. 12, the same components as those of the imaging unit 10 illustrated in FIG. 8 bear the same reference numerals or characters as those in FIG. 8 and the description thereof is omitted.

A main portion 411a of the image-forming optical system retainer 41a has screw holes 51a passing therethrough in the lz-axis direction. The sensor retainer 42a have a main portion 421a having a plate shape. The sensor retainer 42a have no through-hole and is pushed upward by distal ends of screws 44a screwed into the screw holes 51a from a lower side.

In this example, the elastic member 43a is a coil spring. The elastic members 43a are interposed between the image-forming optical system retainer 41a and the sensor retainer 42a, and both ends thereof are respectively fixed to the image-forming optical system retainer 41a and the sensor retainer 42a. The screws 44a apply a repelling force between the image-forming optical system retainer 41a and the sensor retainer 42a, while the elastic members 43a apply an attracting force therebetween. The distance D between the lens inside the image-forming optical system 11 and the imaging plane C of the image sensor 12 and the direction thereof are adjusted by adjusting the amount of screwing of the headed screws 44a into the screw holes 51a. In other words, relative positions of the image-forming optical system retainer 41a and the sensor retainer 42a are fixed by the elastic member 43a and the headed screw 44a.

Note that FIG. 12 illustrates two elastic members 43a, two headed screws 44a, and two screw holes 51a by way of example, and another elastic member 43a, headed screw 44a, and screw hole 51a are not illustrated in the figure.

A fourth preferred embodiment of the present invention will now be described. The vehicle-mounted image recognition apparatus according to the fourth preferred embodiment is different from the vehicle-mounted image recognition apparatus 1 according to the first preferred embodiment in that the positional relationship of the imaging plane C of the image sensor 12 and the image-forming optical system 11 is fixed not by screws but by an adhesive.

Figure 13:
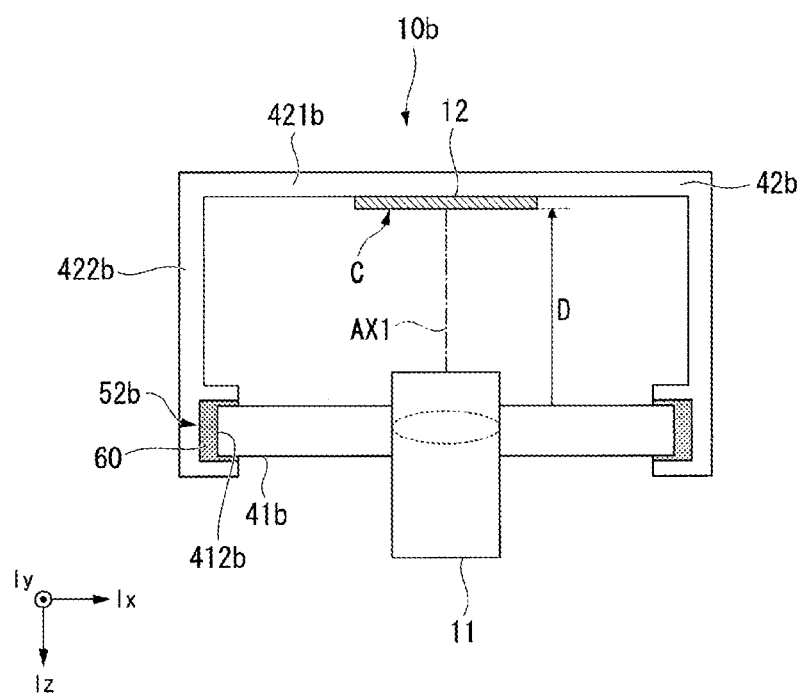
FIG. 13 is a partial sectional view of an imaging unit of a vehicle-mounted image recognition apparatus according to a fourth preferred embodiment of the present invention.

FIG. 13 is a partial sectional view of an imaging unit 10b of a vehicle-mounted image recognition apparatus according to the fourth preferred embodiment. Of the components of the imaging unit 10b illustrated in FIG. 13, the same components as those of the imaging unit 10 illustrated in FIG. 8 bear the same reference numerals or characters as those in FIG. 8 and the description thereof is omitted.

The imaging unit 10b includes an image-forming optical system retainer 41b and a sensor retainer 42b. The image-forming optical system retainer 41b and the sensor retainer 42b are bonded to each other by an adhesive 60.

The sensor retainer 42b holds the image sensor 12. The sensor retainer 42b includes a main portion 421b having a plate shape and a pair of arm portions 422b extending in the optical axis direction. The main portion 421b extends intersecting the optical axis AX1, and an arm portion 422b is connected to each end thereof. The distal end portion of the arm portion 422b includes a groove 52b opening toward the image-forming optical system retainer 41b.

As illustrated in FIG. 13, the adhesive 60 is applied into the groove 52b. The width in the lz-axis direction of the groove 52b is wider than the width in the lz-axis direction of the image-forming optical system retainer 41b. There is a gap between an edge portion 412b of the image-forming optical system retainer 41b and the bottom of the groove 52b. For this reason, before the adhesive 60 is applied and before the adhesive 60 is cured, the edge portion 412b of the image-forming optical system retainer 41b is movable in the lx, ly, and lz directions and is rotatable around the lx, ly, and lz axes while staying in the groove 52b.

Examples of the adhesive 60 include an ultraviolet curable resin cured by irradiation with ultraviolet light. The adhesive 60 applied to the groove 52b is not cured before irradiation with ultraviolet rays. In the state in which the distance D between the image-forming optical system 11 and the imaging plane C of the image sensor 12 and the directional relationship therebetween are adjusted, the adhesive 60 applied to the groove 52b is irradiated with ultraviolet rays. Then, the adhesive 60 is cured by irradiation with ultraviolet rays. With the distance D and the direction being adjusted, the positional relationship of the image-forming optical system retainer 41b and the sensor retainer 42b is relatively fixed.

A non-limiting example of a method of manufacturing a vehicle-mounted image recognition apparatus 1b according to the fourth preferred embodiment will now be described.

Figure 14:
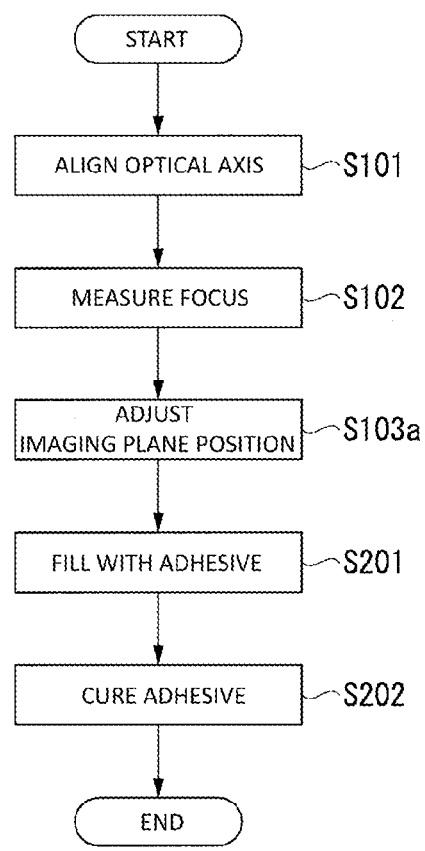
FIG. 14 is a flowchart of a method of manufacturing the vehicle-mounted image recognition apparatus according to the fourth preferred embodiment of the present invention.

FIG. 14 is a flowchart of the method of manufacturing the vehicle-mounted image recognition apparatus 1b according to the fourth preferred embodiment.

The method of manufacturing the vehicle-mounted image recognition apparatus 1b according to the fourth preferred embodiment is different from the method of manufacturing the vehicle-mounted image recognition apparatus 1 according to the first preferred embodiment in that the method of manufacturing the vehicle-mounted image recognition apparatus 1b according to the fourth preferred embodiment includes an optical axis alignment step (step S101a), an imaging plane position adjustment step (step S103a), a filling step (step S201) of filling with the adhesive 60, and a curing step (step S202) of curing the adhesive 60, instead of the optical axis alignment step (step S101), the imaging plane position adjustment step (step S103), and the fixing step (step S104). Thus, the description is omitted about procedures common to the method of manufacturing the vehicle-mounted image recognition apparatus 1b according to the fourth preferred embodiment and the method of manufacturing the vehicle-mounted image recognition apparatus 1 according to the first preferred embodiment.

First, the edge portion 412b of the image-forming optical system retainer 41b is inserted into the groove 52b of the sensor retainer 42b. At this time, each of the sensor retainer 42b and the image-forming optical system retainer 41b is retained by an unillustrated jig. Each of the jigs can change the relative direction and positional relationship of the sensor retainer 42b and the image-forming optical system retainer 41b. Note that the edge portion 412b is placed in a state not in contact with a surface of an inner side of the groove 52b.

Next, the direction of the optical axis AX1 of the image-forming optical system 11 fixed to the image-forming optical system retainer 41b is measured and the optical axis AX1 is aligned in a desired direction in the optical axis alignment step (step S101a). The desired direction refers to such a direction that the optical axis AX1 perpendicularly intersects the imaging plane C and passes through the center of the imaging plane C. The edge portion 412b of the image-forming optical system retainer 41b is not in contact with the inner side of the groove 52b of the sensor retainer 42b. Thus, the use of the jig allows the image-forming optical system retainer 41b to move in the lx, ly, and lz directions relative to the sensor retainer 42b and rotate around the lx, ly, and lz axes.

In the imaging plane position adjustment step following the focus measurement step (step S102), the position of the imaging plane C of the image sensor 12 is adjusted (step S103a). More specifically, the image-forming optical system retainer 41b is moved along the optical axis AX1 relative to the sensor retainer 42b by operating the jig.

In this manner, the position of the imaging plane C of the image sensor 12 in the optical axis AX1 direction is adjusted closer to the image height 70% circumferential focus than the middle between the image height 70% circumferential focus and the image height 70% radial focus.

Next, a gap between a side surface of the image-forming optical system retainer 41b and the groove 52b of the sensor retainer 42b is filled with the adhesive 60 in the filling step (step S201). More specifically, in a state in which the side surface of the image-forming optical system retainer 41b faces the groove 52b in the arm portion of the sensor retainer 42b but they are not in contact with each other (with a predetermined gap therebetween), at least a portion of the gap between the side surface of the image-forming optical system retainer 41b and the groove 52b is filled with the adhesive 60.

The filling step with the adhesive 60 may be performed before, after or concurrently with the imaging plane position adjustment step (step S103a). When the adhesive 60 is applied before the imaging plane position adjustment step (step S103a), the adhesive 60 may be applied in advance to the side surface of the image-forming optical system retainer 41b or the groove 52b of the sensor retainer 42b.

Then, the adhesive 60 is cured in the curing step (step S202). The adhesive 60 is cured, for example, by irradiation with ultraviolet rays. When the adhesive 60 is cured, the relative positions of the image-forming optical system retainer 41b and the sensor retainer 42b, and the direction thereof are fixed. Thus, the relative position of the image sensor 12 and the image-forming optical system 11, and the direction thereof are fixed.

Partial curing of the adhesive 60 is acceptable. In other words, the relative position of the image sensor 12 and the image-forming optical system 11, and the direction thereof may be fixed in two or more stages. For example, when the adhesive 60 is fixed in two or more stages, the fixation attained in the first stage preferably has a strength adequate enough to maintain the adjusted state of the image-forming optical system 11, which ensures the preservation of the directional relationship of the image-forming optical system 11 and the image sensor 12 in subsequent stages without difficulty.

In this manner, the relative position of the image-forming optical system 11 and the image sensor 12, and the directions thereof are finely adjusted and are able to be maintained without impairing the finely adjusted state.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle-mounted image recognition apparatus comprising:
    a fixed-focus image-forming optical system having an optical axis, the image-forming optical system forming an image of a front scene at a rear position on the optical axis;
    an image sensor disposed at the rear position on the optical axis of the image-forming optical system, the optical axis extending through an imaging plane of the image sensor;
    a sensor retainer holding the image sensor;
    an image-forming optical system retainer holding the image-forming optical system; and
    an integrated circuit obtaining data of the image captured by the image sensor and performing an image recognition process; wherein
    at least a portion of a gap between the sensor retainer and the image-forming optical system retainer is filled with an adhesive;
    an edge portion of the image-forming optical system retainer is not in contact with the sensor retainer;
    at least a lower half of the imaging plane is located closer to a circumferential focus than a middle between a radial focus and the circumferential focus, at a position distant from an optical axis center of the image by about 70% of an image height of the image;
    a distance between the circumferential focus and the imaging plane is smaller than a distance between the circumferential focus and the radial focus;
    the integrated circuit recognizing a line indicating a traffic lane on a road surface in performing the image recognition process;
    the radial focus is defined as a point at which a maximum radial resolving power of light converging through the image-forming optical system is obtained when a projection surface moves along the optical axis;
    the circumferential focus is defined as a point at which a maximum circumferential resolving power of the converging light is obtained when the projection surface moves along the optical axis;
    the lower half is defined as a portion of the imaging plane on which a lower half of the scene in a vertical direction is projected;
    the image height is defined as half a diagonal length of the imaging plane; and
    the optical axis center is defined as an intersection of the optical axis and the imaging plane.

2. The vehicle-mounted image recognition apparatus of claim 1, wherein an image captured by the image sensor has generally a rectangular shape; and
    a length from a center of the image to an either one of the horizontal edge of the image is smaller than about 70% of an image height of the image.

3. The vehicle-mounted image recognition apparatus of claim 1, wherein the distance between the circumferential focus and the imaging plane is less than half a distance between the imaging plane and the radial focus at the position distant from the optical axis center by about 70% of the image height.

4. The vehicle-mounted image recognition apparatus of claim 2, wherein the distance between the circumferential focus and the imaging plane is less than half a distance between the imaging plane and the radial focus at the position distant from the optical axis center by about 70% of the image height.

5. The vehicle-mounted image recognition apparatus of claim 1, wherein
    at the position distant from the optical axis center on the imaging plane of the image sensor by about 70% of the image height, the circumferential resolving power of the image projected on the imaging plane through the image-forming optical system is higher than the radial resolving power;
    the circumferential resolving power is defined as a modulation transfer function value with respect to an image of a plurality of black straight lines arranged in a circumferential direction at an interval of about $1/(9d)$ lp/mm and extending in a radial direction on the imaging plane, d (mm) being a pixel spacing of the image sensor.

6. The vehicle-mounted image recognition apparatus of claim 2, wherein
    at the position distant from the optical axis center on the imaging plane of the image sensor by about 70% of the image height, the circumferential resolving power of the image projected on the imaging plane through the image-forming optical system is higher than the radial resolving power;
    the circumferential resolving power is defined as a modulation transfer function value with respect to an image of a plurality of black straight lines arranged in a circumferential direction at an interval of about $1/(9d)$ lp/mm and extending in a radial direction on the imaging plane, d (mm) being a pixel spacing of the image sensor.

7. The vehicle-mounted image recognition apparatus of claim 3, wherein
    at the position distant from the optical axis center on the imaging plane of the image sensor by about 70% of the image height, the circumferential resolving power of the image projected on the imaging plane through the image-forming optical system is higher than the radial resolving power;
    the circumferential resolving power is defined as a modulation transfer function value with respect to an image of a plurality of black straight lines arranged in a circumferential direction at an interval of about $1/(9d)$ lp/mm and extending in a radial direction on the imaging plane, d (mm) being a pixel spacing of the image sensor.

8. The vehicle-mounted image recognition apparatus of claim 4, wherein
    at the position distant from the optical axis center on the imaging plane of the image sensor by about 70% of the image height, the circumferential resolving power of the image projected on the imaging plane through the image-forming optical system is higher than the radial resolving power;

the circumferential resolving power is defined as a modulation transfer function value with respect to an image of a plurality of black straight lines arranged in a circumferential direction at an interval of about 1/(9d) lp/mm and extending in a radial direction on the imaging plane, d (mm) being a pixel spacing of the image sensor.

9. The vehicle-mounted image recognition apparatus of claim 5, wherein the image sensor includes a color filter array on a surface of the imaging plane; and the circumferential resolving power has a value greater than or equal to about 50%.

10. The vehicle-mounted image recognition apparatus of claim 6, wherein the image sensor includes a color filter array on a surface of the imaging plane; and the circumferential resolving power has a value greater than or equal to about 50%.

11. The vehicle-mounted image recognition apparatus of claim 7, wherein the image sensor includes a color filter array on a surface of the imaging plane; and the circumferential resolving power has a value greater than or equal to about 50%.

12. The vehicle-mounted image recognition apparatus of claim 8, wherein the image sensor includes a color filter array on a surface of the imaging plane; and the circumferential resolving power has a value greater than or equal to about 50%.

13. The vehicle-mounted image recognition apparatus of claim 9, wherein the image-forming optical system has an F value less than or equal to 2.

14. The vehicle-mounted image recognition apparatus of claim 10, wherein the image-forming optical system has an F value less than or equal to 2.

15. The vehicle-mounted image recognition apparatus of claim 11, wherein the image-forming optical system has an F value less than or equal to 2.

16. The vehicle-mounted image recognition apparatus of claim 12, wherein the image-forming optical system has an F value less than or equal to 2.

17. A vehicle-mounted image recognition apparatus comprising:

a fixed-focus image-forming optical system having an optical axis, the image-forming optical system forming an image of a front scene at a rear position on the optical axis;

an image sensor disposed at the rear position on the optical axis of the image-forming optical system, the optical axis extending through an imaging plane of the image sensor;

a sensor retainer holding the image sensor;

an image-forming optical system retainer holding the image-forming optical system; and an integrated circuit obtaining data of the image captured by the image sensor and performing an image recognition process; wherein at least a portion of a gap between the sensor retainer and the image-forming optical system retainer is filled with an adhesive;

an edge portion of the image-forming optical system retainer is not in contact with the sensor retainer;

at least in the lower half of the imaging plane located at a position of 70% of the image height from the optical axis center, a circumferential resolving power of an image projected on the image sensor by the imaging optical system is higher than a radial resolving power;

the integrated circuit recognizing a line indicating a traffic lane on a road surface in performing the image recognition process;

the radial focus is defined as a point at which a maximum radial resolving power of light converging through the image-forming optical system is obtained when a projection surface moves along the optical axis;

the circumferential focus is defined as a point at which a maximum circumferential resolving power of the converging light is obtained when the projection surface moves along the optical axis;

the lower half is defined as a portion of the imaging plane on which a lower half of the scene in a vertical direction is projected;

the image height is defined as half a diagonal length of the imaging plane; and the optical axis center is defined as an intersection of the optical axis and the imaging plane.

18. The vehicle-mounted image recognition apparatus of claim 17, wherein the image sensor includes a color filter array on a surface of the imaging plane; and a circumferential resolving power has a value greater than or equal to about 50%;

the circumferential resolving power is defined as a modulation transfer function value with respect to an image of a plurality of black straight lines arranged in a circumferential direction at an interval of about 1/(9d) lp/mm and extending in a radial direction on the imaging plane, d (mm) being a pixel spacing of the image sensor.

19. The vehicle-mounted image recognition apparatus of claim 17, wherein an image captured by the image sensor has generally a rectangular shape; and a length from a center of the image to an either one of the horizontal edge of the image is smaller than about 70% of an image height of the image.

20. The vehicle-mounted image recognition apparatus of claim 18, wherein the imaging plane of the image sensor has generally a rectangular shape; and a length from a center of the imaging plane to an either one of the horizontal edge of the imaging plane is smaller than about 70% of an image height of the image.

21. The vehicle-mounted image recognition apparatus of claim 17, wherein the image-forming optical system has an F value less than or equal to 2.

22. The vehicle-mounted image recognition apparatus of claim 18, wherein the image-forming optical system has an F value less than or equal to 2.

23. The vehicle-mounted image recognition apparatus of claim 19, wherein the image-forming optical system has an F value less than or equal to 2.

24. The vehicle-mounted image recognition apparatus of claim 20, wherein the image-forming optical system has an F value less than or equal to 2.

* * * * *